(12) United States Patent
Story, Jr. et al.

(10) Patent No.: US 9,348,554 B2
(45) Date of Patent: May 24, 2016

(54) MANAGING PLAYBACK OF SUPPLEMENTAL INFORMATION

(75) Inventors: Guy A. Story, Jr., New York, NY (US); Doug S. Goldstein, Riverdale, NY (US)

(73) Assignee: Audible, Inc., Newark, NJ (US)

( * ) Notice: Subject to any disclaimer, the term of this patent is extended or adjusted under 35 U.S.C. 154(b) by 446 days.

(21) Appl. No.: 13/332,157

(22) Filed: Dec. 20, 2011

(65) Prior Publication Data

US 2013/0159853 A1 Jun. 20, 2013

(51) Int. Cl.
*G06F 17/24* (2006.01)
*G06F 3/16* (2006.01)
*G09B 5/06* (2006.01)
*G09B 21/00* (2006.01)

(52) U.S. Cl.
CPC ............ *G06F 3/165* (2013.01); *G06F 17/241* (2013.01); *G09B 5/06* (2013.01); *G09B 21/006* (2013.01)

(58) Field of Classification Search
CPC ... G06F 17/241; G06F 2201/835; G06F 3/16; G09B 5/06
USPC .......... 715/233, 716, 727–729, 730–732, 776
See application file for complete search history.

(56) References Cited

U.S. PATENT DOCUMENTS

| | | | |
|---|---|---|---|
| 6,587,127 B1 * | 7/2003 | Leeke et al. ................... 715/765 |
| 6,601,103 B1 * | 7/2003 | Goldschmidt Iki et al. .. 709/231 |
| 7,114,170 B2 * | 9/2006 | Harris et al. ..................... 725/34 |
| 7,321,887 B2 * | 1/2008 | Dorner et al. |
| 8,028,314 B1 * | 9/2011 | Sezan ............... G06F 17/30828 709/223 |
| 8,046,689 B2 * | 10/2011 | Naik et al. ..................... 715/727 |
| 8,316,302 B2 * | 11/2012 | McKoen et al. ............... 715/728 |
| 8,316,303 B2 * | 11/2012 | Roberts et al. ................ 715/728 |
| 8,516,375 B2 * | 8/2013 | Bono et al. .................... 715/716 |
| 8,543,454 B2 * | 9/2013 | Fleischman et al. ....... 705/14.44 |
| 8,645,991 B2 * | 2/2014 | McIntire ............ H04N 7/17318 725/34 |
| 2002/0099552 A1 * | 7/2002 | Rubin et al. ................... 704/270 |
| 2002/0120925 A1 * | 8/2002 | Logan .............................. 725/9 |
| 2005/0193335 A1 * | 9/2005 | Dorai ............... G06F 17/30893 715/234 |
| 2008/0119132 A1 * | 5/2008 | Rao ............................. 455/3.04 |
| 2009/0210779 A1 * | 8/2009 | Badoiu ............... G06F 17/3082 715/230 |
| 2009/0251440 A1 | 10/2009 | Edgecomb et al. |
| 2010/0017694 A1 * | 1/2010 | Wick et al. .................... 715/201 |
| 2010/0049741 A1 * | 2/2010 | Harrison .................... 707/104.1 |
| 2010/0251386 A1 | 9/2010 | Gilzean et al. |

(Continued)

OTHER PUBLICATIONS

International Search Report issued for PCT/US12/70565 mailed Mar. 4, 2013, 2 pages.

(Continued)

*Primary Examiner* — Andrew Tank
(74) *Attorney, Agent, or Firm* — Knobbe Martens Olson & Bear LLP

(57) ABSTRACT

A computing device may provide an interface that enables a user to playback audio content including supplemental information. The supplemental information may correspond, for example, to endnotes, footnotes, glossaries, appendices, commentary from an author, editor, or other party, or to additional supplemental information. During playback of the audio content, a user may indicate that an item of supplemental information associated with a current playback position of the audio content should be played. In some embodiments, this indication may be in response to an indication to the user that supplemental information is available. The device may then playback the supplemental information associated with the current playback position.

26 Claims, 8 Drawing Sheets

(56) References Cited

U.S. PATENT DOCUMENTS

2010/0324709 A1* 12/2010 Starmen .......................... 700/94
2012/0197648 A1* 8/2012 Moloney ....................... 704/500
2015/0106854 A1* 4/2015 Fabian-Isaacs ...... H04N 21/439
                                                                725/52

OTHER PUBLICATIONS

Written Opinion of the International Searching Authority issued for PCT/US12/70565 mailed Mar. 4, 2013, 8 pages.

* cited by examiner

MANAGING PLAYBACK OF SUPPLEMENTAL INFORMATION

BACKGROUND

Traditional printed books, electronic books or other printed media (whether in electronic or physical form) often contain a primary text and additional, supplementary information, such as footnotes, end notes, glossaries and appendices. These items of supplementary information often contain useful or interesting information, such as additional background or explanatory text regarding the primary text, external references, or commentary.

Frequently, printed media are converted into audio format. Generally, this may involve narrating and recording a reading of the printed medium. The resulting audio book or audio content may then be made available to users. Audio content may be played back on a wide variety of devices, such as notebook and tablet computers, mobile phones, personal music players, electronic book ("eBook") readers, and other audio playback devices or devices with audio playback capability.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
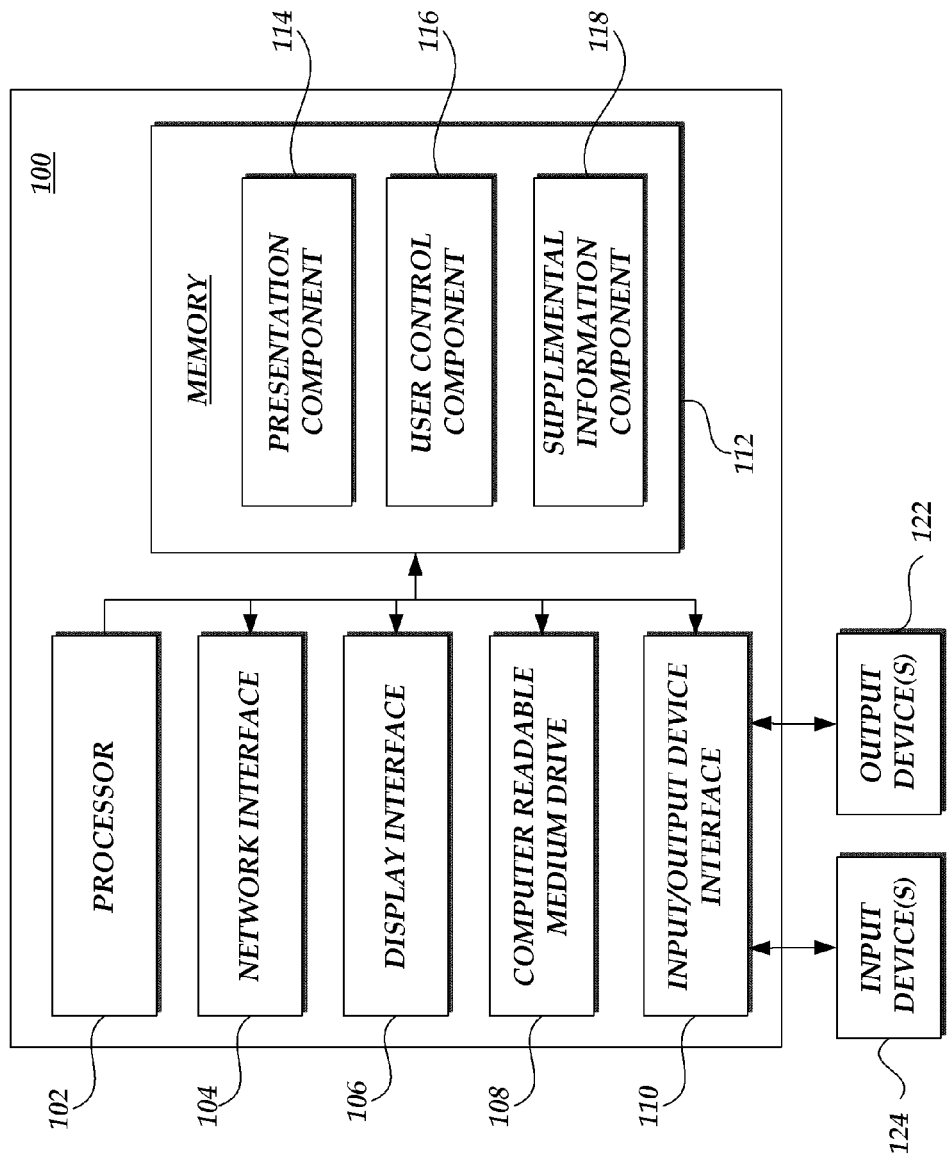
FIG. 1 is a block diagram depicting an illustrative embodiment of a computing device configured to implement playback of supplemental audio information.

Generally described, aspects of the present disclosure relate to the output of supplemental audio information on a computing device. Specifically, systems and methods are disclosed for controlling the playback of audio content including one or more items of supplemental information, such as footnotes, endnotes, glossary information, or commentary. For example, a user may utilize a computing device such as a personal music player in order to obtain access to audio content including supplemental audio information. While listening to the audio content, the user may receive an indication that supplemental information is available and associated with recently played or upcoming audio content. This supplemental information may correspond to information contained within a printed text from which the audio content was created. For example, footnotes, endnotes, glossaries, and appendices may all constitute supplemental information. Further, supplemental information may correspond to other information, such as author or editor commentary, or commentary from other users who have purchased the audio content. Still further, supplemental information may correspond to commentary generated by contacts of a user. Such contacts may be associated with the user via an electronic marketplace used to retrieve audio content, through one or more social networking systems, or through other systems. One example for determining contacts of a user is given in U.S. patent application Ser. No. 12/871733, filed on Aug. 30, 2010 and entitled "CUSTOMIZING CONTENT BASED ON SOCIAL NETWORK INFORMATION" which is hereby incorporated by reference in its entirety.

The supplemental information provided with an audio content may or may not be contained within a corresponding printed text. After receiving an indication that supplemental information is available, the user may enter a command indicating they wish to listen to the supplemental information. In some embodiments, the command may be received for some period before or after the point at which the supplemental information is available (e.g., the user may be given n seconds during which a command can be entered). This command may be obtained at the personal music player by any input, such as the press of a button, or, where the personal music player is equipped with a microphone or other audio input, speaking a command. After receiving the command, the personal music player may then output the supplemental information to the user. Illustratively, after playing the supplemental information, the personal music player may return to the audio content at the position at which the user entered the command, or a position near that at which the user entered the command.

As will be described below, various embodiments may be used exclusive to or in combination with the illustrative example described above. For example, in one embodiment, the personal music player may not output an indication that supplemental information is available, or may only indicate the availability of supplemental information that would be of particular interest the user. Preventing indication of every item of supplemental information may be beneficial, for example, where the amount of supplemental information is large or where supplemental information is frequently available. Illustratively, a glossary or appendix of an audio content may be provided which contains explanatory information regarding characters, terms, locations, or entities within an audio content. It may not be desirable to indicate the presence of this supplemental information at every mention of those characters, terms, etc., within the audio content. Instead, the personal music player may be configured to receive a command to play supplemental information at any point within an audio content, and may search for supplemental information corresponding to a word recently recited in the audio content. Illustratively, if playback of an audio content mentions a character name with which the user is not familiar, the user may input a command to search for supplemental information. The personal music player may detect that the audio recently discussed the character, and locate corresponding supplemental information associated with the character. In this manner, a user listening to audio content may be provided with access to the same reference information given to a reader of text. In these embodiments, an error may be played if no supplemental information associated with the current playback position can be found.

In some embodiments, the audio content may be associated with corresponding textual content. For example, a personal music player may store an audio content and the corresponding text. In some instances, the corresponding text may be a book from which the audio content is created. In other instances, the text may be a transcript created from the audio content. One example of synchronization of textual and audio content is given in U.S. patent application Ser. No. 13/070, 313, filed on Mar. 23, 2011 and entitled "SYTEMS AND METHODS FOR SYNCHRONIZING DIGITAL CONTENT" which is hereby incorporated by reference in its entirety.

In these embodiments, the correlation of audio and text content may be used to provide additional functionality or to further enhance features described above. For example, as described above, when playback of an item of supplemental information has concluded, play may continue from a point at or near the point where the user issued a command to play the supplemental information. Illustratively, playback may resume at the exact point the command was received, or at some fixed time period prior to that point (e.g., 3 or 5 seconds). However, in embodiments where information regarding the text corresponding to the played audio is known, playback may resume at a point determined at least in part based on the corresponding text. For example, playback may resume at the point in the audio content just prior to the sentence spoken in which the user indicated supplemental information should be played. In other embodiments, playback may resume at the beginning of a paragraph, a word, or other unit of text. In these embodiments, an indicator of supplemental information may be suppressed for supplemental information that has already been played.

Correlations between audio and text may further be used to enhance the above embodiments. For example, in embodiments where a user may request supplemental information regarding any character, term, etc., by issuing a command to play supplemental information, the personal music player may use text corresponding to recently played audio to search for such terms in a provided glossary or appendix.

In some embodiments, an item of supplemental information may be associated with multiple positions within a primary audio content. For example, supplemental information may be associated with a position within a chapter of an audio content, and also associated with the end of that chapter. In this manner, a user may have multiple opportunities to hear an item of supplemental information. Further, an item of supplemental information may be associated with a position within another item of supplemental information. For example, a first item of supplemental information may be associated with a position in a primary audio content, and a second item of supplemental information may be associated with a position in the first item of supplemental information. The second item of supplemental information may itself have one or more additional items of supplemental information associated with it. As such, multiple levels of supplemental information may be provided, each new level associated with a previous level or the primary audio content. In embodiments where associations of supplemental information would cause the supplemental information to be available multiple times within a playback of audio content, indication of the availability of that supplemental information may be suppressed after the first indication that the supplemental information is available. In other embodiments, indication of supplemental information may be suppressed after the supplemental information has been fully played.

In some embodiments, audio content and supplemental information may be stored within data storage of a playback device. In other embodiments, audio content and/or supplemental information may be stored remotely from the playback device, such as on a remote server. Illustratively, the playback device may be configured to retrieve audio content and/or supplemental information from the remote server. In some embodiments, supplemental information associated with audio content may be retrieved at substantially the same time as the audio content. In other embodiments, a playback device may be configured to retrieve supplemental information periodically. For example, a playback device may query a remote server associated with audio content every n hours in order to determine whether new supplemental information is available. In further embodiments, a playback device may query a remote server for supplemental information associated with a currently played audio content. In still other embodiments, a remote server may be configured to notify a playback device of available supplemental information.

In some embodiments, a user of a playback device may specify types of supplemental information which are desired. For example, a user may specify that supplemental information associated with the author (e.g., footnotes, glossaries, author commentary, etc.) should be played, while supplemental information associated with the publisher (e.g., editor commentary, etc.) should not be played. Further, a user may specify that supplemental information associated with contacts of the user should be played, while supplemental information associated with general users of an electronic marketplace from which the audio content was acquired should not be played.

In further embodiments, a user of a playback device may specify categories of supplemental information which are desired. For example, where audio content has been acquired from an electronic marketplace, the electronic marketplace may categorize items of supplemental information into one or more categories. Examples of such categories include, but are not limited to, "Top Rated," "Funny," "Insightful," "Informative," and "Interesting." Illustratively, a user may specify that only supplemental information listed as "Top Rated" or "Funny" should be presented for playback, while other supplemental information should be excluded. In some embodiments, where a user has excluded some types of supplemental information and where that supplemental information is stored remotely from a playback device, it may not be necessary for the playback device to retrieve the remotely stored supplemental information.

Although the preceding description refers to a personal music player, any computing device capable of presenting audio content to a user may be used in accordance with the present disclosure. Such a computing device can include, but is not limited to, a laptop, personal computer, a tablet computer, personal digital assistant (PDA), hybrid PDA/mobile phone, mobile phone, electronic book reader, digital media player, integrated components for inclusion in computing devices, appliances, electronic devices for inclusion in vehicles or machinery, gaming devices, set top boxes, electronic devices for inclusion in televisions, and the like. These computing devices may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors and the like.

In addition, audio content can refer to any data containing audio information that can be directly or indirectly accessed by a user, including, but not limited to, multi-media data, digital video, audio data, electronic books ("eBooks"), electronic documents, electronic publications, computer-executable code, portions of the above, and the like. References to textual content or other visually displayed content should be understood to include any form of visual or tactile content, including text, images, charts, graphs, slides, maps, Braille, embossed images, or any other content capable of being displayed in a visual or tactile medium. Content may be stored on a computing device, may be generated by the computing device, or may be streamed across a network for display or output on the computing device. Moreover, content may be obtained from any of a number of sources, including a network content provider, a local data store, computer readable media, a content generation algorithm (e.g., a text-to-speech algorithm) running remotely or locally, or through user input (e.g., text entered by a user). Content may be obtained, stored, or delivered from any one or combination of sources as described above.

FIG. 1 is a block diagram illustrating an embodiment of a computing device 100 configured to implement playback of content including supplemental information. The computing device 100 may have one or more processors 102 in communication with a network interface 104, a display interface 106, a computer readable medium drive 108, and an input/output device interface 110, all of which communicate with one another by way of a communication bus. The network interface 104 may provide connectivity to one or more networks or computing systems. The processor(s) 102 may thus receive information and instructions from other computing systems or services via a network. The processor(s) 102 may also communicate to and from memory 112 and further provide output information or receive input information via the display interface 106 and/or the input/output device interface 110. The input/output device interface 110 may accept input from one or more input devices 124, including, but not limited to, keyboards, mice, trackballs, trackpads, joysticks, input tablets, trackpoints, touch screens, remote controls, game controllers, heart rate monitors, velocity sensors, voltage or current sensors, motion detectors, transponders, global positioning systems, radio frequency identification tags, or any other input device capable of obtaining a position or magnitude value from a user. The input/output interface may also provide output via one or more output devices 122, including, but not limited to, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports, as described above. The display interface 106 may be associated with any number of visual or tactile interfaces incorporating any of a number of active or passive display technologies (e.g., electronic-ink, LCD, LED or OLED, CRT, projection, holographic imagery, three dimensional imaging systems, etc.) or technologies for the display of Braille or other tactile information.

Memory 112 may include computer program instructions that the processor(s) 102 executes in order to implement one or more embodiments. The memory 112 generally includes RAM, ROM and/or other persistent or non-transitory computer-readable storage media. Memory 112 may store a presentation module 114 for managing the output of information to a display and/or other output device(s) 122 via the display interface 106 and/or input/output interface 110. The memory 112 may further include a user control module 116 for managing and obtaining user input information received for one or more input device 124 via the input/output device interface 110. In one embodiment, the user control module 116 may additionally interpret user input information in order to initiate playback of supplemental information. Memory 112 may further store a supplemental information module 118. In one embodiment, the supplemental information module 118 may detect the presence of supplemental information associated with a recently played or upcoming item of audio content (e.g., output via the presentation module 114). The supplemental information module 118 may cause the presentation module 114 to output an indication that the supplemental information is available. This indication may correspond to any type of output possible via the output devices 122. For example, the indication may correspond to audio output via a speaker or headphone. This audio content may include a tone, bell, voice indication, or other sound indicating the presence and availability of additional content. In addition, the indication may correspond to visual output via display interface 106. Still further, the indication may correspond to a haptic indication, such as a vibration caused by a haptic feedback device included with the display interface 106 or otherwise provided.

In addition, the supplemental information module 118 may receive and interpret user input via the user control module 116 to determine whether to cause playback of supplemental information. When a command to play supplemental information is received, the supplemental information module 118 may cause playback of supplemental information associated with the current point of audio playback via the output device 122. Still further, the supplemental information module 118 may interpret commands received during the playback of supplemental information. As described above, supplemental information itself may be associated with one or more items of supplemental information. Illustratively, the supplemental information module 118 may interpret input received during playback of a first item of supplemental information to indicate a command to play a second item of supplemental information associated with the first supplemental information. In some embodiments, a user may issue a command to stop playback of an item of supplemental information. The supplemental information module 118 may interpret a received input as such a command and cause the presentation module 114 to return to playback for the previous item of content (i.e., the supplemental information or primary audio content played before playback of a current item of audio content).

Figure 2:
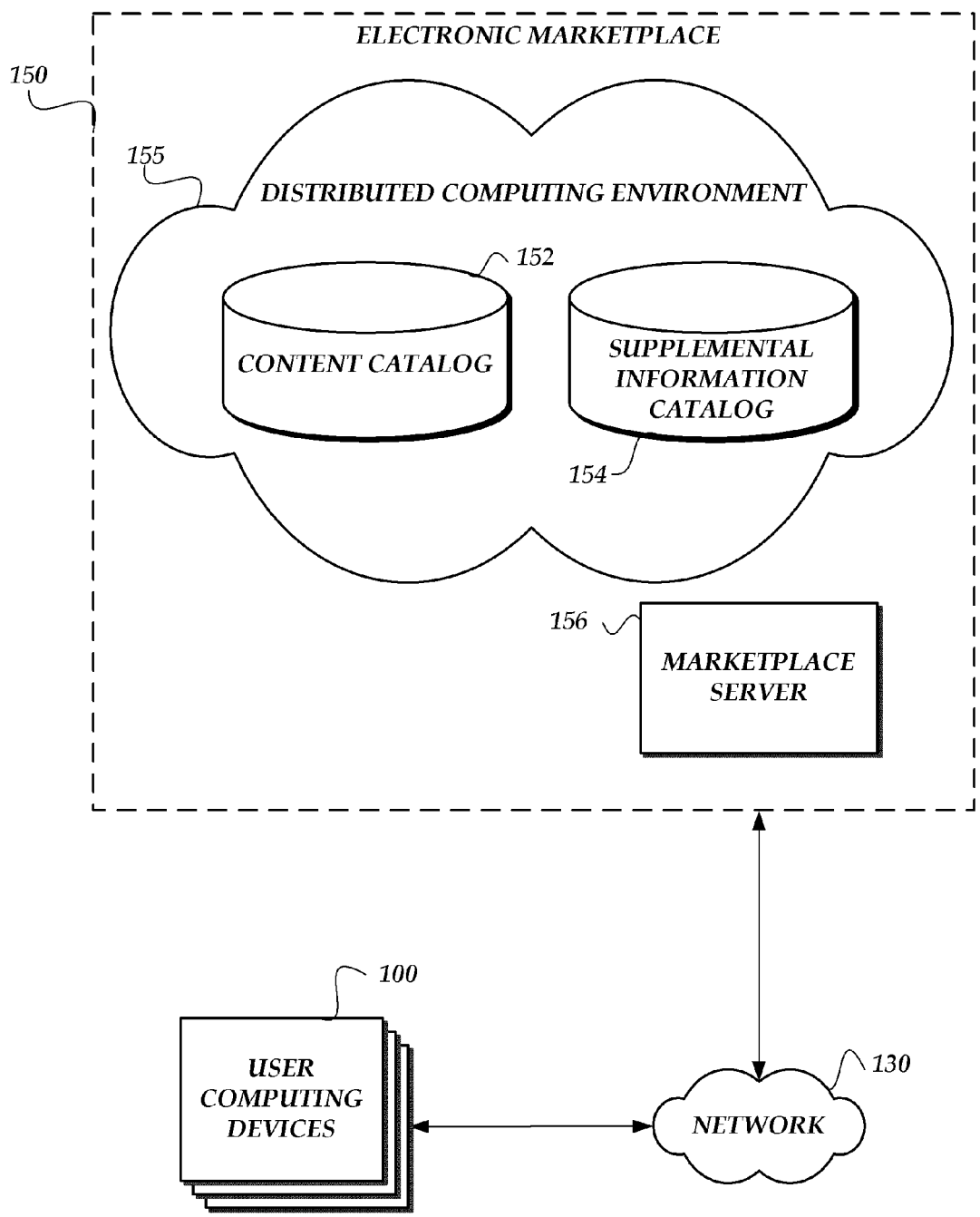
FIG. 2 is a schematic block diagram depicting an illustrative operating environment in which a computing device of FIG. 1 may interact with an electronic marketplace to acquire audio content and supplemental information.

FIG. 2 is a schematic block diagram depicting an illustrative operating environment in which a computing device of FIG. 1 may interact with an electronic marketplace 150 to acquire audio content and supplemental information. As illustrated in FIG. 2, the operating environment includes one or more user computing devices 100, such as a computing device of FIG. 1, in communication with the electronic marketplace 150 via a network 130.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

Accordingly, a user, using his or her user computing device 100, may communicate with the electronic marketplace 150 regarding audio content. Supplemental information regarding audio content may also be made available by the electronic marketplace 150. In one embodiment a user, utilizing his or her computing device 100 may browse descriptions of audio content made available by the electronic marketplace 150. In another embodiment, a user, utilizing his or her computing device 100 may acquire desired audio content or supplemental information regarding audio content from the electronic marketplace 150.

The electronic marketplace 150 is illustrated in FIG. 2 as operating in a distributed computing environment comprising several computer systems that are interconnected using one or more networks. More specifically, the electronic marketplace 150 may include a marketplace server 156, a content catalog 152, a supplemental information catalog 154, and a distributed computing environment 155 discussed in greater detail below. However, it may be appreciated by those skilled in the art that the electronic marketplace 150 may have fewer or greater components than are illustrated in FIG. 1. In addition, the electronic marketplace 150 could include various Web services and/or peer-to-peer network configurations. Thus, the depiction of electronic marketplace 150 in FIG. 1 should be taken as illustrative and not limiting to the present disclosure.

Any one or more of the marketplace server 156, the content catalog 152, and the supplemental information catalog 154 may be embodied in a plurality of components, each executing an instance of the respective marketplace server 156, content catalog 152, and supplemental information catalog 154. A server or other computing component implementing any one of the marketplace server 156, the content catalog 152, and the supplemental information catalog 154 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 156, content catalog 152, and supplemental information catalog 154. The memory may generally include RAM, ROM, other persistent and auxiliary memory, and/or any non-transitory computer-readable media.

In this illustrative example, the content catalog 152 and the supplemental information catalog 154 can be implemented by the distributed computing environment 155. In addition, in some embodiments, the marketplace server 156 or other components of the electronic marketplace 150 may be implemented by the distributed computing environment. In some embodiments, the entirety of the electronic marketplace 150 may be implemented by the distributed computing environment 150.

The distributed computing environment 155 may include a collection of rapidly provisioned and released computing resources hosted in connection with the electronic marketplace 150 or a third party. The computing resources may include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a distributed computing environment is given in U.S. Pat. No. 7,865,586, issued on Jan. 4, 2011 and entitled "Configuring Communications Between Computing Nodes" which is hereby incorporated by reference in its entirety. A distributed computing environment may also be referred to as a cloud computing environment.

With further reference to FIG. 2, illustrative components of the electronic marketplace 150 will now be discussed. The marketplace server 156 may enable browsing and acquisition of audio content and/or supplemental information relating to audio content available from the electronic marketplace 150. Further, the marketplace server 156 may transmit audio content and/or supplemental information to user computing devices 100.

The content catalog 152 may include information on audio content available from the electronic marketplace 150. The supplemental information catalog 154 may include supplemental information available from the electronic marketplace 150. Such supplemental information may include, by way of non-limiting example, supplemental information provided or generated by authors, editors, publishers, users of the electronic marketplace 150, or other third parties. Accordingly, the marketplace server 156 may obtain audio content information for audio content offered by the electronic marketplace 150, as well as supplemental information offered by the electronic marketplace 150, and may make such audio content and supplemental information available to a user from a single network resource, such as a Web site. A user may then acquire audio content and/or supplemental information from the electronic marketplace 150.

Illustratively, marketplace server 156 may generate one or more user interfaces through which a user utilizing a user computing device 100 or a distinct computing device, may browse audio content and/or supplemental information made available by the electronic marketplace 150, submit queries for matching audio content and/or supplemental information, view information and details regarding specific audio content and/or supplemental information, and acquire audio content and/or supplemental information.

After the user selects desired audio content and/or supplemental information from the electronic marketplace 150, the marketplace server 156 may facilitate the acquisition of the audio content and/or supplemental information. In this regard, the marketplace server 156 may receive payment information from the user computing device 100 or distinct computing device. Further, the marketplace server 156 may, transmit the audio content and/or supplemental information to the user computing device 100.

In some embodiments, the marketplace server 156 may, subsequent to acquisition of an item of audio content, inform a user computing device 100 or newly available supplemental information which is associated with the audio content. In still more embodiments, the marketplace server 156 may enable streaming of audio content and/or supplemental information from the content catalog 152 or the supplemental information catalog 154 to a user computing device 100.

Though described herein with reference to catalogs associated with an electronic marketplace 150, in some embodiments, a playback device may obtain audio information or supplemental information from additional or alternative sources, such as third party content catalogs or supplemental information catalogs.

Figure 3:
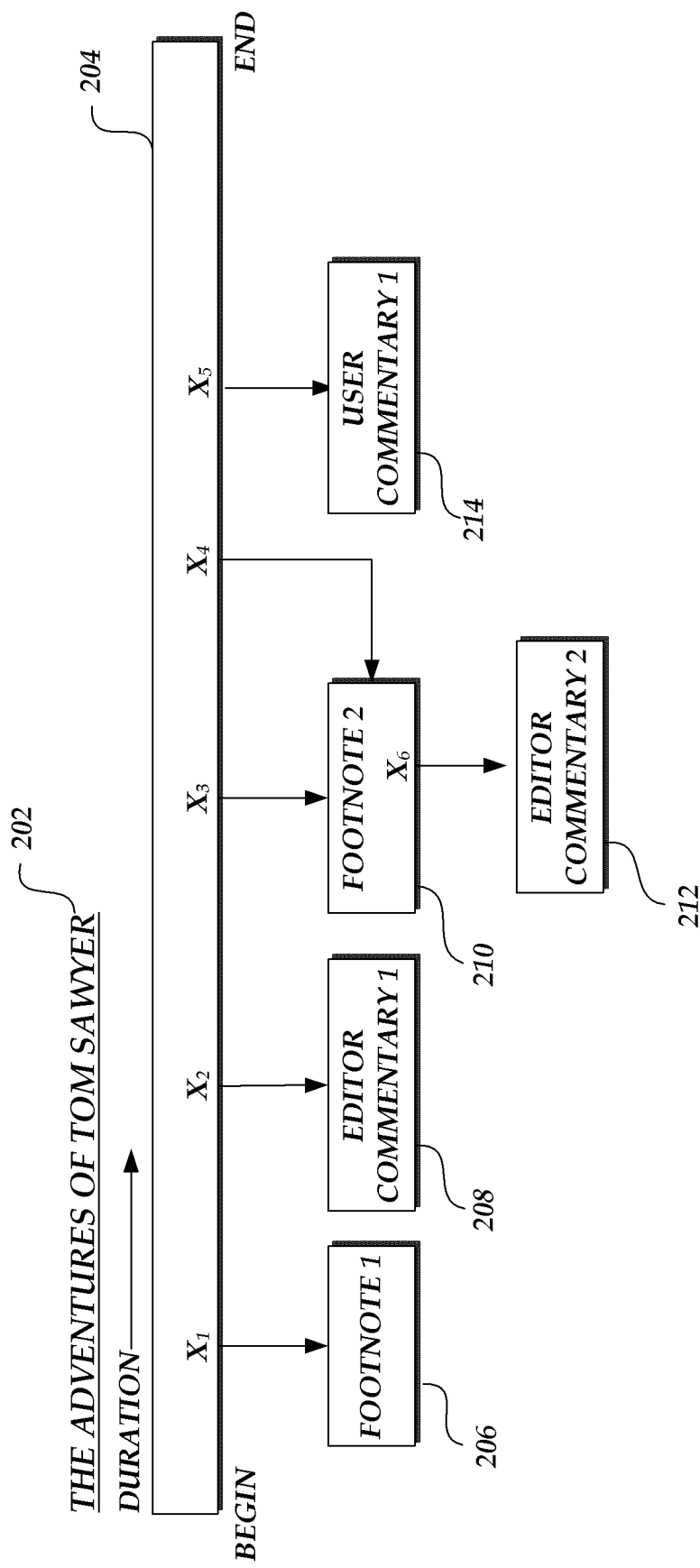
FIG. 3 is an illustrative graphical representation or visualization of audio content including supplemental information.

FIG. 3 is an illustrative graphical representation or visualization of audio content including supplemental information. As shown in FIG. 3, the audio content corresponds to the audio book "The Adventures of Tom Sawyer." The primary audio content 204 represents the content of the audio book excluding supplemental information. Illustratively, the primary audio content 204 can represent a visual map of audio content, such that the duration of the audio content 204 is displayed from left to right. As also shown in FIG. 3, the primary audio content 204 is associated with supplemental information 206-214. Each item of supplemental information 206-214 is associated with one or more points $X_1$-$X_6$ in either the primary audio content 204 or another item of supplemental information 206-214. Though described herein with reference to specific points within the audio content 204, in some embodiments, supplemental information may be associated with a range of points within the audio content 204, or with a specified duration of audio content 204. As discussed above, supplemental information may include footnotes (supplemental information 206 and 210), editor commentary (supplemental information 208 and 212), or additional content (supplemental information 214). Additional content may correspond to other types of supplemental information described above, such as author commentary or commentary of other readers of the audio content.

An illustrative user interaction with the audio content 202 will now be described with reference to FIG. 3. Illustratively, the audio content of the book 202 may be played by a computing device, such as device 100 of FIG. 1, beginning at the left of 204 and proceeding to the right. At point $X_1$, the computing device 100 may indicate to the user that supplemental information 206 is available for playback. The user may input a command that the supplemental information 206 should be played. At this point, playback of the audio content 202 may temporarily cease, and playback of the supplemental information 206 may begin. After completion of playback of supplemental information 206, playback of the audio content 204 may resume. As discussed above, playback may resume at or near the point $X_1$, such as a set amount of time before $X_1$ (e.g., 3 seconds), or the beginning of the sentence or paragraph containing $X_1$.

As playback proceeds to $X_2$, the device 100 can indicate the availability of supplemental information 208. As described above, such indication may correspond to a visual indication, audio indication, haptic indication, or any combination therein. As described above, the user may be given a period of time (e.g., 10 seconds) in which to command playback of supplemental information. In this example, if the user does not input a command to play supplemental information 208, playback of the audio content 202 continues.

At point $X_3$, the device 100 may indicate the availability of supplemental information 210, and receive a user command to play the content 210. As displayed in FIG. 3, supplemental information 210 is itself associated with supplemental information 212. At the point $X_6$ during playback of the supplemental information 210, the device 100 can indicate availability of supplemental information 212 and receive a command to play the content 212. During playback of supplemental information 212, the device 100 may receive a command from the user to stop playback of supplemental information 212. In some embodiments, this may cease playback of content 212 and resume playback of content 210 at or near the point $X_6$. In other embodiments, the command received during playback of supplemental information 212 may resume playback of the primary audio content 204 at or near the point $X_3$, the last point played of the audio content 204.

As playback of the primary audio content continues, a point $X_4$ may be encountered which is associated with a previously played item of supplemental information 210. In some embodiments, if the supplemental information 210 has already been played, the device 100 may not indicate the presence of supplemental information 210 at $X_4$. In other embodiments, an indication may be suppressed only if supplemental information 210 was played completely. In still other embodiments, an indication may always be played.

At point $X_5$, the device 100 may indicate the presence of supplemental information 214. As described above, the user may input a command to the device 100 to indicate a desire to play supplemental information 214. If this input is received, supplemental information 214 is played. Otherwise, playback of the primary audio content 204 proceeds, until it reaches the end of audio content 204 or until user input is received which causes the audio content 204 to stop playing.

Figure 4A:
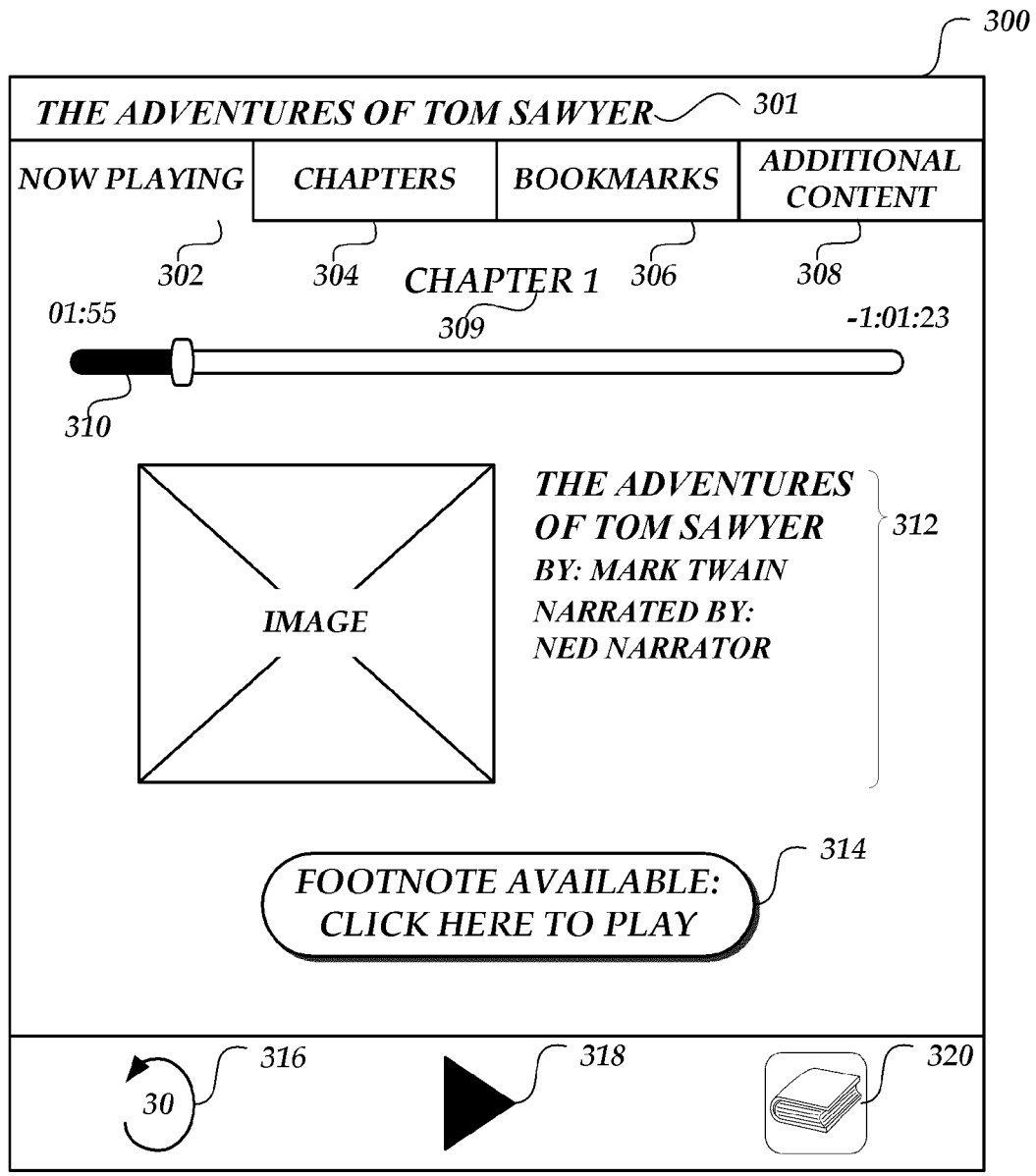
FIGS. 4A-4D depict illustrative user interfaces that may be used to facilitate playback of supplemental audio information.
Figure 4B:
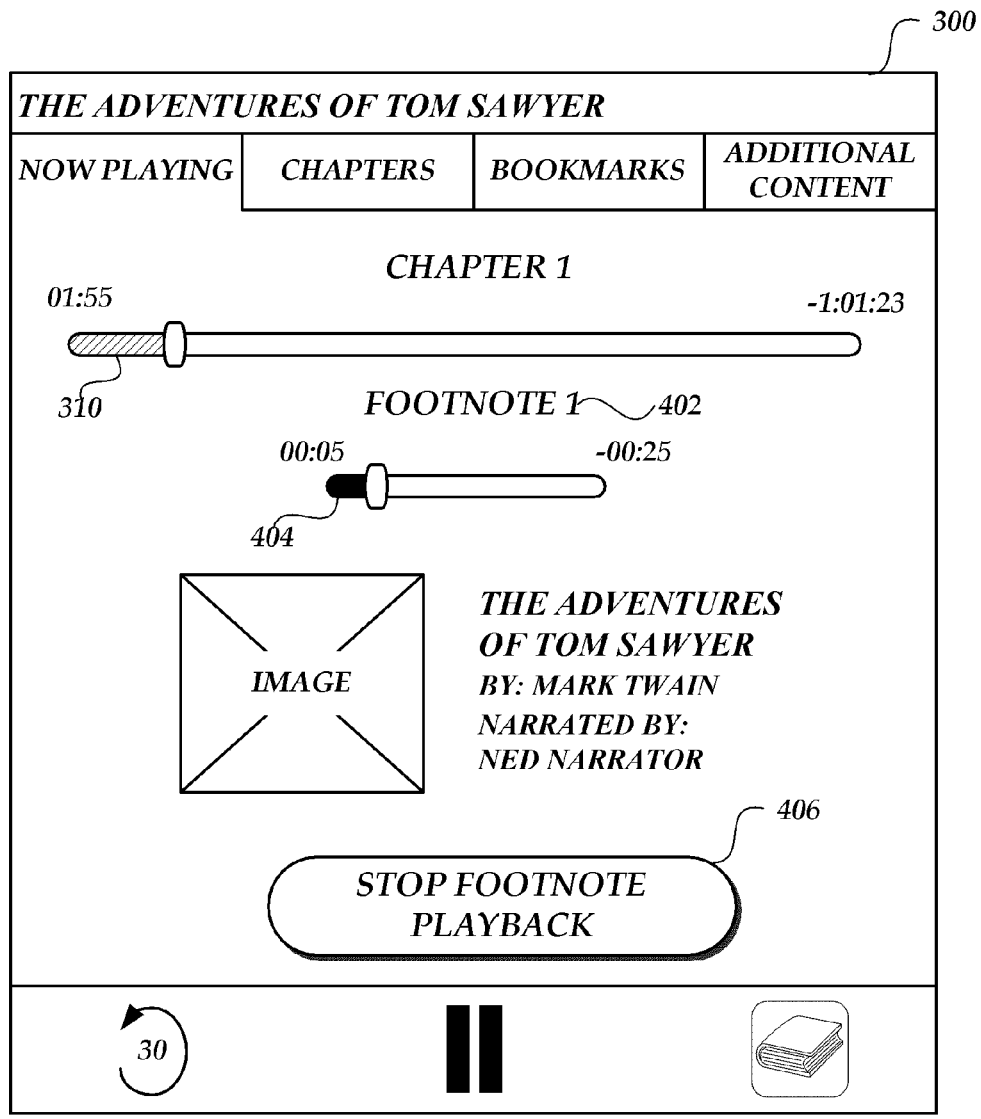
Figure 4C:
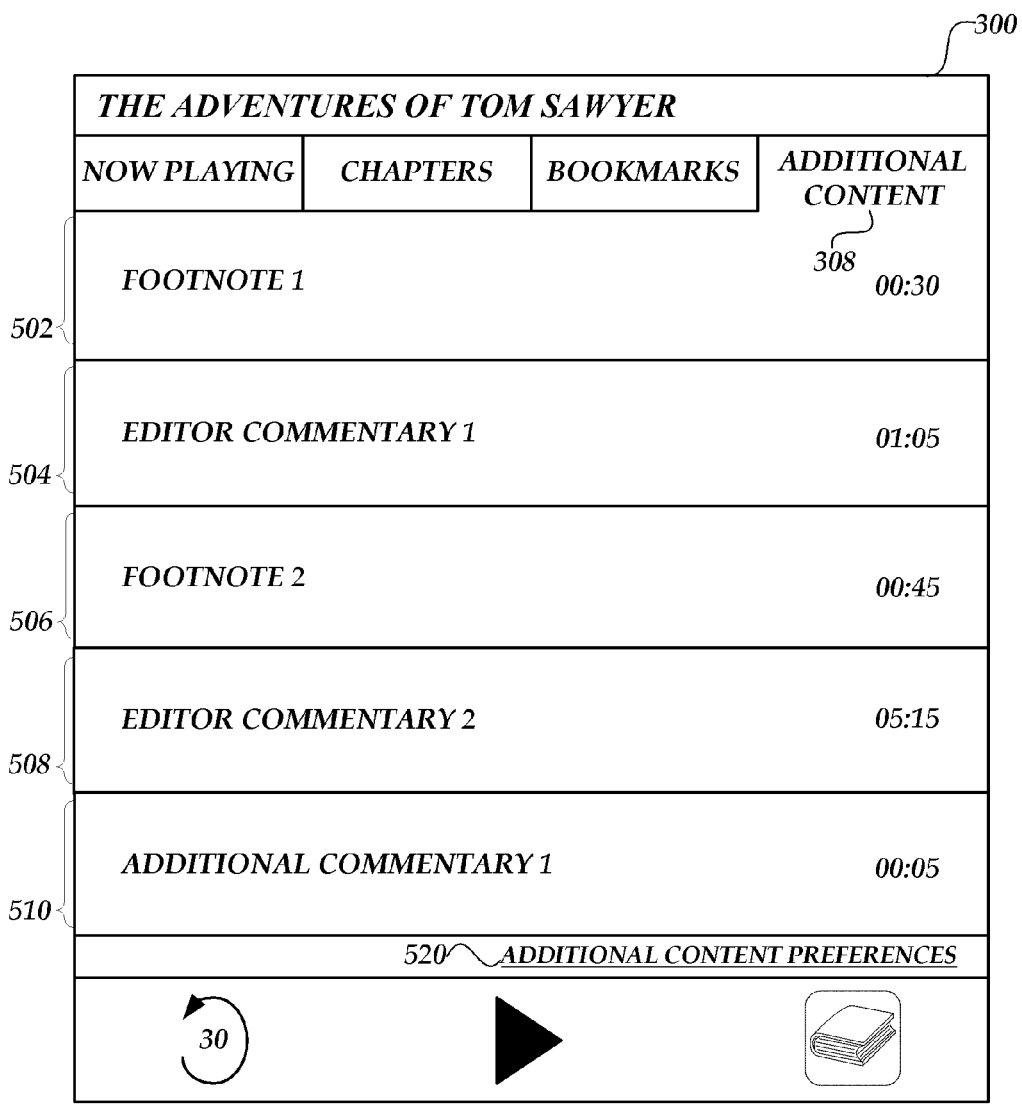

FIGS. 4A-4C depict an illustrative user interface 300 displayed by a computing device, such as computing device 100 of FIG. 1, that allows playback and interaction with supplemented audio content. In these examples, the audio content illustratively corresponds to the audio content 204 of FIG. 3.

The title of the audio content 204 is displayed as "The Adventures of Tom Sawyer" 301. The user interface 300 contains a number of input controls 302-304, each of which may be selected by a user to display a different aspect of the user interface 300. As illustrated in FIG. 4A, the input control 302, corresponding to "Now Playing" is currently selected. Further input controls 316-320 allow various inputs by the user, such as rewinding playback for a period of time with input control 316, starting and stopping playback with input control 318 (the display of which may alter between play and pause symbols depending on the playback state), and bookmarking a current position with input control 320. The interface includes audio content information 312, such as a graphic associated with the audio content, title, author, and narrator information, and a chapter indicator 309 that displays the current chapter of the audio content 204 that is ready for playback.

The interface 300 further includes content indicator 310 that indicates the content of the current of the chapter, as well as a progress indicator 311, which indicates the position of playback within the currently selected chapter. Illustratively, the position of the progress indicator 311 may correspond to position $X_1$ of FIG. 3, which is associated with supplemental information 206. As such, the user interface 300 further includes an input control 314 which indicates the availability of the supplemental information 206. As described above, the input control 314 may be displayed for a period before or after the position $X_1$, to allow a user time to request playback of the supplemental information 206. After selection of the input control 314, playback of the audio content 204 may be temporarily ceased, and playback of the supplemental information 206 may begin.

FIG. 4B depicts the illustrative user interface 300 during playback of an item of supplemental information, such as supplemental information 206. As shown in FIG. 3B, content indicator 310 may be altered to indicate that playback of the primary audio content has been temporarily halted. Further, the user interface 300 may include a supplemental information title indicator 402 which describes the currently playing supplemental information. A supplemental information indicator 404 may be provided that displays the content and position within the currently playing supplemental information. The user interface 300 also includes an input control 406 which allows the user to stop playback of the current supplemental information and return to the primary audio content. As described above, playback of the primary audio content may resume at the point at which it ceased or a point nearby, such as the beginning of a paragraph or sentence, or a point some period (e.g., 3 seconds) prior. Though the user interface 300 of FIG. 4B displays only input control 406 to return to the primary audio content, in some embodiments, an additional input control may be provided to play additional supplemental information associated with the currently playing supplemental information, as is described above.

FIG. 4C depicts the illustrative user interface 300 after user selection of input control 308, which is configured to cause display of the supplemental information associated with the currently loaded audio content. In the current example, each input control 506-510 is selectable by a user to play the associated supplemental information independent of the primary audio content. In some embodiments, selection of an item of supplemental information via input controls 502-510 may cause the content to be played independent of the audio content. In other embodiments, selection of supplemental information via input controls 502-510 may cause the selected content to be played, and further cause playback of the audio content from a point with which the supplement content is associated. The user interface 300 of FIG. 4C may further include an input control 520 which is selectable by a user to display a different aspect of the user interface 300, such as a portion of the user interface 300 which enables the user to specify preferences regarding supplemental information.

Figure 4D:

FIG. 4D depicts the illustrative user interface 300 after user selection of input control 520, which is configured to cause display of a portion of the user interface 300 which enables a user to specify preferences regarding supplemental information. In some embodiments, such user preferences may be specific to the currently depicted audio content (e.g., "The Adventures of Tom Sawyer"). In other embodiments, user preferences may be specified for all audio content, or for specific sets of audio content.

The illustrative user interface 300 of FIG. 4D contains user selectable input controls 552-558 which enable the user to specify various types of supplemental information which should be provided. For example, input control 552 corresponds to author provided supplemental information, which may include, for example, footnotes, endnotes, glossary information, or author commentary. Input control 554 corresponds to publisher provided supplemental information, which may include editor commentary or additional information provided by a publisher of audio content. Input controls 556 and 558 correspond to supplemental information associated with other users of the electronic marketplace 150. Specifically, input control 556 corresponds to users associated with the current user of the user interface 300. In some embodiments, these associated users may correspond to users designated as contacts or "friends" in the electronic marketplace 150. In other embodiments, these associated users may correspond to users designated as contacts or "friends" through external systems, such as one or more social networking systems in communication with the electronic marketplace 150. In addition, input control 558 corresponds to general users of the electronic marketplace 150 who are not necessarily designated as a contact or "friend" of the current user.

Illustratively, selection of one or more of the input controls 552-558 may cause the computing device 100 to retrieve supplemental information provided by the corresponding source (e.g., the author, the publisher, friends, or other users) during or prior to playback of audio content with which the supplemental information is associated. Supplemental information may be retrieved, for example, from the electronic marketplace 150 of FIG. 2 via the network 130. In some embodiments, supplemental information may be retrieved from the electronic marketplace 150 regardless of user selection of input controls 552-558. For example, where supplemental information is retrieved prior to playback of corresponding audio content, retrieval of supplemental information regardless of user selection of input controls 552-558 may enable a user to select new supplemental information for playback immediately, without waiting for the new supplemental information to be retrieved. In still more embodiments, user selection of one or more of the input controls 552-558 may enable or disable the availability of the associated supplemental information during playback of audio content. For example, de-selection of input control 552 may disable playback of supplemental content generated by the author of the audio content.

The user interface 300 as depicted in FIG. 4D further includes input controls 560, which may enable a user to specify categories of desired supplemental information. For example, each item of supplemental information may be classified as one or more of "Top Rated," "Funny," "Insightful," "Informative," or "Interesting." In some embodiments, such classification may be accomplished by the operator of the electronic marketplace 150. In further embodiments, such classification may be accomplished by users of the electronic marketplace 150. Illustratively, de-selection of one or more of the input controls 160 may disable playback of correspondingly tagged supplemental information. For example, if a particular item of supplemental information is classified by the electronic marketplace 150 as "funny," and the user of the computing device 100 de-selects the input control 560 corresponding to "Funny," then that particular item of supplemental content may not be available during playback of audio content. As a further example, if a particular item of supplemental information is classified by the electronic marketplace 150 as "top rated," and the user of the computing device 100 selects the input control 560 corresponding to "Top Rated," then that particular item of supplemental content may be made available during playback of audio content. In some embodiments, only specific types of supplemental information may be categorized. For example, supplemental information generated by contacts or general users may be categorized, while supplemental information generated by the author or publisher may not be. In these embodiments, input controls 560 may apply only to supplemental information which is categorized. In other embodiments, input controls 560 may apply to all supplemental information.

The user interface 300 as depicted in FIG. 4D further includes input controls 562 and 563, which may enable a user to specify a limit to the amount of supplemental information provided during playback of audio content. For example, input control 562 may enable a user to specify that no more than three items of supplemental information should be presented during any one minute of audio playback. As a further example, input control 563 may enable a user to specify a maximum duration of supplemental information that should be presented. In addition to limits per time period (e.g., minutes, hours, etc.), limits may, for example, be imposed over the course of a paragraph, page, chapter, book, or other measurement period.

After specifying one or more preferences regarding supplemental information, the user may return to portion of the user interface 300 displayed in FIG. 4C by selection of input control 564.

Though not shown in FIG. 4, in some embodiments, a user may provide preferences indicating one or more items, categories, or types of supplemental information that should be presented automatically, without output of an indication and without requiring user input. For example, a user may specify that all "top rated" items of supplemental information should be automatically presented, indicators should be provided for "funny" supplemental information, and no indicator should be provided for supplemental information only marked as "interesting." As will be appreciated by those skilled in the art, such preferences may be combined to specify that any given item of supplemental information should be automatically presented, indicated for presentation or playback, or not indicated for presentation or playback.

Figure 5:
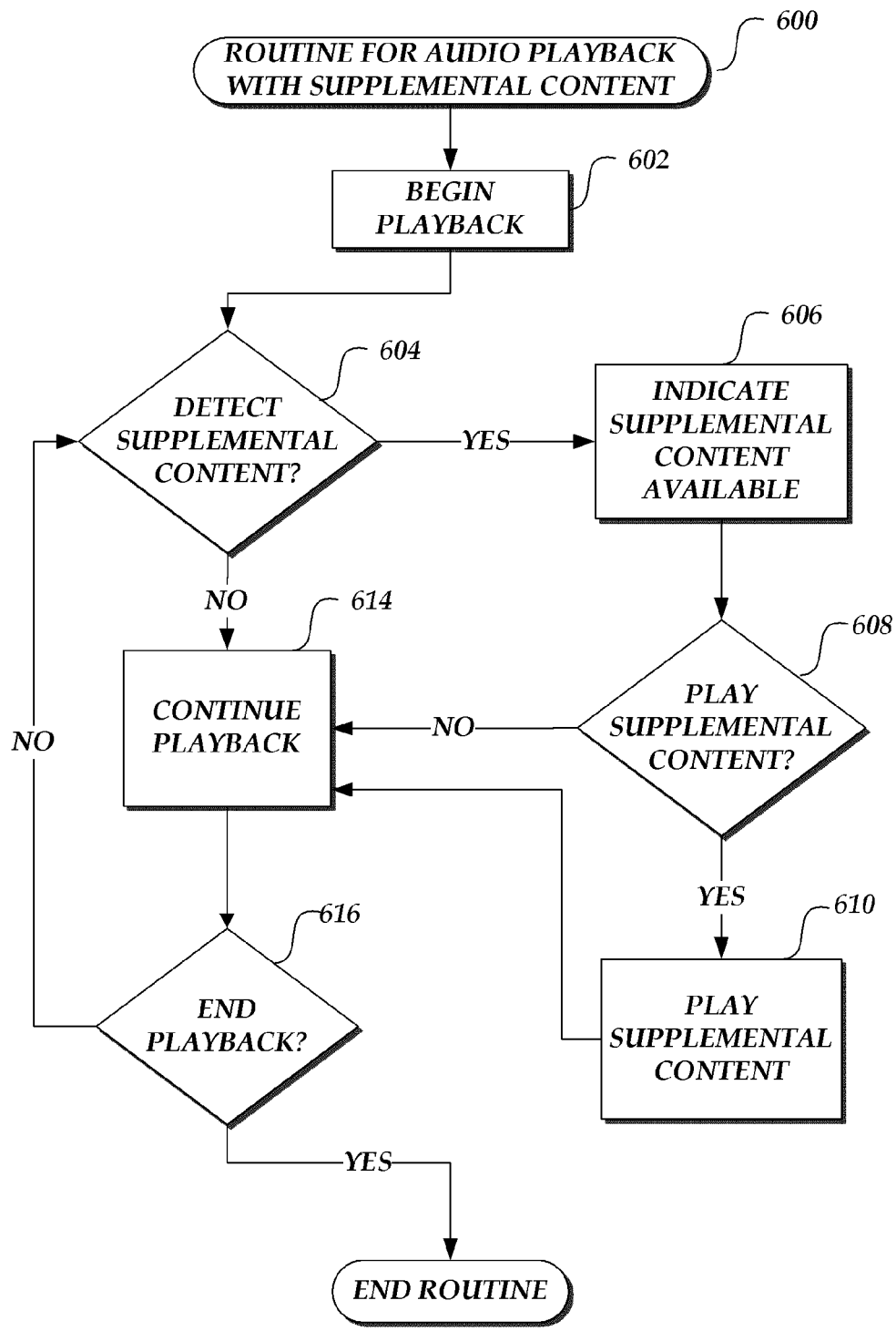
FIG. 5 is a flow diagram depicting an illustrative routine for playback of supplemental audio information.

FIG. 5 is a flow diagram depicting an illustrative routine 600 for playback of supplemented audio content. The routine 600 may illustratively be implemented by the supplemental information module 118 of the computing device 100. The routine 600 begins at block 602, which causes the playback of a primary audio content, such as audio content 204. Playback may begin, for example, in response to user selection of input control 318 of FIGS. 4A-4C.

At block 604, the computing device 100 determines whether supplemental information is associated with a current position within the primary audio content. As described above, supplemental information may be made associated with a range of positions within a primary audio content (e.g., with a continuous 10 second range). If supplemental information is not available, playback continues at block 614, described below. If the current playback position is within such a range, and supplemental information is therefore available, the routine 600 proceeds to block 606, which outputs to the user an indication that supplemental information is available. As described above, this indication may correspond to audio output by the device 100, such as a tone, bell, voice, or sound, to a visual output, such as the appearance of an input control on a display, or to haptic feedback, such as a vibration of the device 100. At block 608, the computing device 100 tests whether the user has entered a command to play the detected supplemental information. As described above, such a command may correspond to input via a display device or other input control, such as a physical button on the computing device 100 or an accessory connected to the computing device 100 (e.g., headphones). In some embodiments, the command may further correspond to a voice command from the user. If a command is not received, playback continues at block 614, described below. If a command is received, the routine 600 continues to block 610, which causes the playback of the supplemental information (and temporarily stops playback of the primary audio content). After playback of the supplemental information is completed, playback of the primary audio content resumes at block 614. Optionally, the routine 600 may also be configured to receive a user command at block 610 to cease the playback of the supplemental information and immediately resume playback of the primary audio content.

Additionally, as described above, some supplemental information may itself be associated with supplemental information. In these embodiments, additional instances of routine 600 may be executed at block 610, such that the user may indicate that secondary supplemental audio content should be played. As will be appreciated by one skilled in the art, each additional instance of block 610 may create an instance of routine 600, such that playback any configuration of supplemental information may be facilitated.

At block 614, playback of the primary audio content resumes. As discussed above, playback may be resumed at or near the point at which it was ceased. For example, playback may be resumed at a point prior to where playback was ceased, such as the beginning of a previous paragraph. At block 616, the routine 600 tests whether to end playback of the audio content. Playback may be ended, for example, in response to a user command or completion of an item of audio content. If playback is not ended, the routine continues at block 604, as described above. If playback is ended, the routine 600 may end.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors, thus transforming the general purpose computers or processors into specifically configured devices. The code modules may be stored in any type of computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for output of supplemental audio information, the system comprising:
   one or more data stores that store audio content and one or more items of supplemental audio information, wherein each of the one or more items of supplemental audio information is associated with one or more playback positions within the audio content;
   an input device that obtains an input of a user;
   a display device that presents information regarding the audio content;
   an output device that outputs the audio content; and
   a processor in communication with the one or more data stores, the input device, and the output device, the processor operative to:
      receive a preference of the user for outputting an indication that an item of supplemental audio information is available for playback, the preference specifying a maximum number of indications desired to be output within a specified period of time;
      cause output of the audio content via the output device;
      determine that a first item of supplemental audio information of the one or more items of supplemental audio information is :associated with a current playback position within the audio content;

determine that no more than the maximum number indications has been output within the specified period of time;

responsive to determining that no more than the maximum number of indications has been output within the specified period of time, cause output, via at least one of the output device and the display device, of the indication that the first item of supplemental audio information is available for playback;

obtain input from the use indicating that the first item of supplemental audio information should be played; and cause output of the first item of supplemental audio information associated with the current playback position via the output device.

2. The system of claim 1, wherein the processor is further operative to pause output of the audio content in response to the input obtained from the user, and to resume output of the audio content after output of the first item of supplemental audio information.

3. The system of claim 2, wherein the output of the audio content is resumed at a point prior to the point at which the output of the audio content was paused.

4. The system of claim 2, wherein the output of the audio content is resumed at the point at which the output of the audio content was paused.

5. The system of claim 1, wherein the system comprises at least one of a personal music player, a personal computing device, a laptop, a tablet, an eBook reader, and a mobile phone.

6. The system of claim 1, wherein the first item of supplemental audio information comprises at least one of a footnote, editor commentary, author commentary, user commentary, an endnote, glossary information, and an appendix.

7. The system of claim 1, wherein the processor is further operative to obtain input from the user indicating the preference of the user.

8. The system of claim 1, wherein the indication is at least one of a sound, a visual indication, and a vibration.

9. A computer-implemented method for playback of supplemented audio information to a user, wherein the supplemented audio information comprises a primary audio content and one or more items of supplemental audio information, and wherein each item of supplemental audio information is associated with at least one playback position within at least one of the primary audio content and one of the one or More Items of supplemental audio information, the computer-implemented method comprising:

under control of one or More computing devices, causing output of the primary audio content via an output device;

determining that a first item of supplemental audio information of the one or more items of supplemental audio information is associated with a current playback position within the primary audio content being output via the output device;

determining a user preference for outputting an indication during playback of the primary audio content that an item of supplemental audio information is available for playback, the user preference specifying a maximum number of indications to be output within a specified period of time;

determining that a number of indications output within the specified period of time does not exceed the Maximum number of indications;

responsive to determining that the number of indications output within the specified period of time does not exceed the maximum number of indications, causing output of the indication that the first item of supplemental audio inform anon is available for playback;

obtaining input from the user via an input device, the input indicating that the first item of supplemental audio information should be played; and causing output of the first item of supplemental audio information via the output device.

10. The computer-implemented method of claim 9 further comprising receiving the first item of supplemental audio information from a distinct computing device via a network.

11. The computer-implemented method of claim 9, wherein each of the one or more items of supplemental audio information is associated with a range of playback positions within the primary audio content.

12. The computer-implemented method of claim 9, further comprising pausing output of the audio content in response to obtaining the input and resuming output of the audio content after completing output of the first item of supplemental audio information.

13. The computer-implemented method of claim 12, wherein resuming output of the audio content comprises resuming output of the audio content at a point prior to the point at which the output of the audio content was paused.

14. The computer-implemented method of claim 13, wherein the point prior to the point at which the output of the audio content was paused is at a specified duration prior to the point at which the output of the audio content was paused.

15. The computer-implemented method of claim 13, wherein the point prior to the point at which the output of the audio content was paused is determined based at least in part on a text corresponding to the audio content.

16. The computer-implemented method of claim 9, wherein the computer-implemented method is carried out by at least one of a personal music player, a personal computing device, a laptop, a tablet, an eBook reader, and a mobile phone.

17. The computer-implemented method of claim 9, wherein a position within the first item of supplemental audio information is associated with one or more items of secondary supplemental audio information, and wherein the computer-implemented method farther comprises:

determining that an item of secondary supplemental audio information from the one or more items of secondary supplemental audio information is associated with a current playback position within the first item of supplemental audio information;

causing output of an indication that secondary supplemental audio information is available for playback;

obtaining input from the user indicating that the item of secondary supplemental audio information should be played; and causing output of the item of secondary supplemental audio information.

18. A system for outputting supplemental audio information, the system comprising:

one or more data stores that store audio content and one or more items of supplemental audio information, wherein each of the one or more items of supplemental audio information is associated with one or more playback positions within at least one of the audio content and one of the one or more items of supplemental audio information;

a processor in communication with the data store, the processor operative to:

cause output of audio content via an output device;

determine that an item of supplemental audio information from the one or more items of supplemental audio information is associated with a current playback position within the audio content being output via the output device;

determine a user preference for outputting an indication that an item of supplemental audio information is available for playback, the user preference specifying a maximum number of indications to be output within a specified period of time;

determine, that a number of indications output within the specified period of time does not exceed the maximum number of indications:

responsive to the determination that the number of indications output within the specified period of time does not exceed the maximum number of indications, cause output of an indication that supplemental audio information is available for playback;

obtain input from the user via an input device indicating that the supplemental audio information should be played; and cause output of the item of supplemental audio information via the output device.

19. The system of claim 18, wherein the processor is further operative to determine text corresponding to the current playback position within the audio content, and wherein the determination of one of the one or more items of supplemental audio information associated with a current playback position within the audio content is based at least in part on the text corresponding to the current playback position.

20. The system of claim 18, wherein the user preference further includes a maximum length of supplemental audio information preferred by a user, and wherein the processor is further operable to determine that a length of the item of supplemental audio information does not exceed the maximum length.

21. A computer readable, non-transitory storage medium having at least one computer-executable module comprising computer-executable instructions for providing supplemental audio information, the at least one computer-executable module comprising, a supplemental audio information module that, when executed by a processor, causes the processor to:

cause output of a primary audio content, wherein the primary audio content is associated with one or more items of supplemental audio information, and wherein each of the one or more items of supplemental audio information is associated with one or more playback positions within the at least one of the audio content and one of the one or more items of supplemental audio information;

determine one or more items of supplemental audio information associated with a current playback position within the primary audio content;

determine a user preference for outputting an indication that an item of supplemental audio information is available for playback, the user preference specifying a maximum number of indications to be output within a specified period of time;

determine that a number of indications output within the specified period of time does not exceed the maximum number of indications;

responsive to determining that the number of indications output within the specified period of time does not exceed the maximum number of indications, cause output of an indication that supplemental audio information is available for playback;

obtain input indicating that the at least one supplemental audio information should be played; and cause output of the at least one item of supplemental audio information.

22. The computer readable, non-transitory storage medium of claim 21, wherein the supplemental audio information module is further operative to pause output of the primary audio content in response to obtaining, the input and resume output of the primary audio content after completing output of the at least one Item of supplemental audio information.

23. The computer readable, non-transitory storage medium of claim 22, wherein resuming output of the primary audio content comprises resuming output of the primary audio content at a point prior to the point at which the output of the primary audio content was paused.

24. The computer readable, non-transitory storage medium of claim 22, wherein the point prior to the point at which the output of the audio content was paused is determined based at least in part on a text corresponding to the primary audio content.

25. The computer readable, non-transitory storage medium of claim 21, wherein the at least one item of supplemental audio information comprises commentary generated by a contact of the user.

26. The computer readable, non-transitory storage medium of claim 25, wherein the contact comprises at least one of a contact associated with a provider of the primary audio content and a contact associated with a social networking system.

\* \* \* \* \*